Patented Oct. 21, 1941

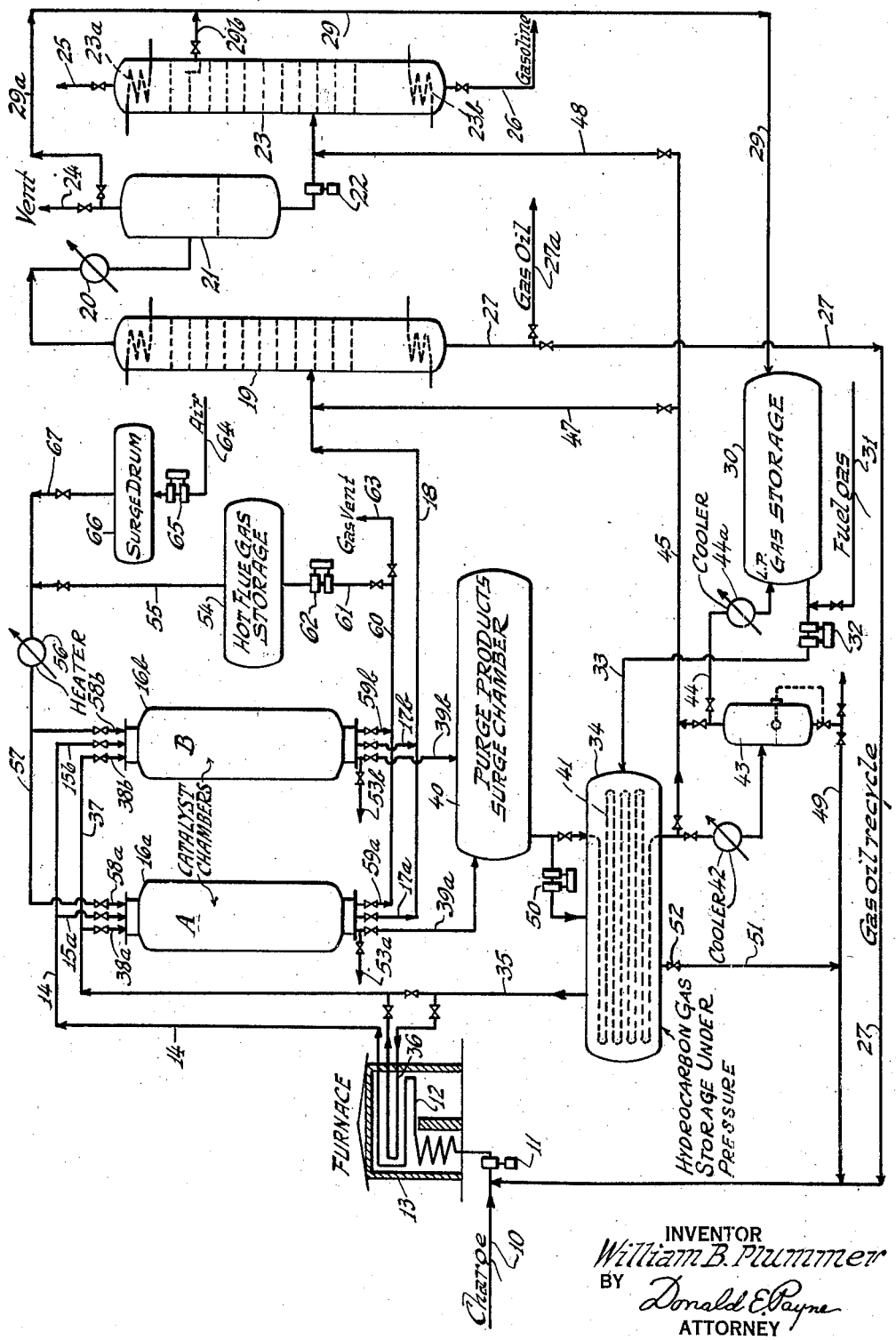

2,259,485

UNITED STATES PATENT OFFICE 2,259,485

CATALYST PURGING

William B. Plummer, Chicago, Ill., assignor to Standard Oil Company, Chicago, Ill., a corporation of Indiana Application September 13, 1939, Serial No. 294,775

7 Claims. (Cl. 196—52)

This invention relates to the purging of catalyst material used in hydrocarbon conversion processes and it pertains more particularly to improved methods and means for the purging of catalyst materials used in catalytic cracking, reforming, dehydrogenation, aromatization, alkylation, isomerization, polymerization, etc.

In many catalytic hydrocarbon conversion processes employing solid catalysts such catalysts gradually lose their effectiveness due to the deposit thereon of carbonaceous materials and it is therefore necessary to regenerate the catalyst by extracting or burning such carbonaceous deposits therefrom. An object of my invention is to minimize hydrocarbon losses incident to the regeneration steps. A further object is to minimize the time required for regeneration, and particularly to minimize the time required for purging catalyst material immediately before and after it is placed on-stream. A further object is to minimize capital investment and operating costs of hydrocarbon processes of this type by thus increasing the possible on-stream catalyst periods.

A further object is to provide an improved purging medium for removing adsorbed oil from catalyst material before said material is regenerated. A further object is to provide improved means for recovering normally liquid hydrocarbons from the purging gas which is employed prior to regeneration.

Another object is to provide an improved method and means for utilizing fuel gases such as propane and other normally gaseous hydrocarbons for recovering valuable hydrocarbons from spent catalyst material. Other objects will be apparent as the detailed description of the invention proceeds.

For certain catalysts the use of steam as a stripping or purging agent is objectionable because of its deleterious effect on the catalyst and/or because of the expense involved. I have discovered that normally gaseous hydrocarbons such as ethane, propane and butane are remarkably effective in removing adsorbed hydrocarbon oils from catalyst surfaces, particularly when employed at temperatures which are only slightly lower than reaction temperatures. In practicing my invention I employ hot hydrocarbon gases of this type at elevated pressures for removing entrained and adsorbed oil from spent catalyst prior to regeneration. By supplying the purge gas under pressure I not only materially expedite the purging action but render it more effective.

Similarly, after the catalyst has been regenerated I expedite the purging of the hot regenerated catalyst by the use of high pressure flue gas for removing oxygen and oxygen-containing gases in the chamber prior to again placing it on-stream. The time required for purging may be reduced from a matter of about 30 minutes or an hour or so to a matter of seconds or only a few minutes, because of the high velocities obtained by the application of the purge gas under pressure. This marked saving in purging time greatly lengthens the effective on-stream period, improves purging efficiency and particularly in the case of spent catalyst, materially reduces the time and amount of oxidation required for regeneration. Overall yields are materially increased and losses are decreased since much of the material which has heretofore been lost by coking or oxidation may be recovered by my process as liquid hydrocarbons.

The invention will be more clearly understood from the following detailed description read in connection with the accompanying drawing which forms a part of the specification and in which the single figure is a schematic flow diagram of a fixed bed conversion system for catalytic cracking.

While the invention will be described in connection with catalytic cracking it should be understood that it is applicable to catalytic reforming, aromatization, dehydration, desulfurization, alkylation, polymerization, etc., in fact to any hydrocarbon conversion process employing solid catalysts which requires regeneration by solvent extraction or oxidation.

The nature of the charging stock depends upon the particular conversion process employed and in the case of cracking I prefer to employ a Mid-Continent, West Texas or East Texas gas oil. Such gas oil is charged through line 10 by pump 11 to coils 12 of furnace 13 wherein the charge is vaporized and heated to a temperature of about 800 to about 1000° F. at a pressure of about atmospheric to about 50 pounds per square inch. My process is, however, applicable to operations at higher reaction pressures. The heated vapors are then passed through transfer line and manifold 14 and thence through one of the branch lines 15a, 15b, etc. to a catalyst chamber 16 which is on-stream.

While two catalyst chambers A and B are illustrated in the drawing it should be understood that any number of catalyst chambers may be employed and that the heated charge may be introduced through lines 15a, 15b, etc., into catalyst chambers A, B, etc. Assuming that catalyst chamber A is charged with fresh or regenerated catalyst, the hot vapors may be introduced through line 15a and the reaction products may be removed from the catalyst chamber through line 17a and manifold 18 to fractionating column 19.

For catalytic cracking I prefer to employ catalysts of the activated clay or synthetic silica-alumina types. The clay type catalysts are preferably treated for several hours with acid or with aqueous solutions of chlorides or sulfates of magnesium, aluminum or manganese, then washed, dried and pelleted. The silica-alumina catalyst is preferably made by precipitation of gel from concentrated water glass solutions having a pH of about 3 to 4, containing about 120 grams of $SiO_2$ per liter. The silica gel may be partially dried and intimately mixed with an aluminum nitrate solution, then dried and heated to about 850° F. to 1050° F. Alternatively, the partially dried or completely dried silica gel may be mechanically homogenized with aluminum hydroxide or the silica gel may be simultaneously precipitated with aluminum oxide from a water glass aluminum nitrate or sulfate solution. A mixture of silica gel and alumina may be made into a paste formed into pellets and dried. Numerous other methods of catalyst precipitation may be employed but they will not be described in further detail because the particular catalyst used is not an essential feature of the present invention, which as above stated is applicable to the use of any solid catalyst which requires periodic regeneration.

The gas oil is preferably passed through the catalyst chamber at about 850 to 950° F. with a space velocity of about 0.5 to 2 volumes of liquid feed per volume of catalyst space per hour. Here again the particular operating conditions will depend on the nature of the stocks charged, the nature of the catalyst and the nature of the particular conversion process. Vapors from fractionating column 19 pass through cooler 20 to gas separator 21 from which gas is vented to recovery system not shown via line 24 and liquids pass through pump 22 to fractionator 23.

From fractionating column 23, which may be of any conventional type and which may be provided with suitable reflux means 23a and reboiler means 23b, normally gaseous hydrocarbons are taken overhead through line 25, and gasoline is removed through line 26.

Gas oil may be withdrawn from the system through lines 27 and 27a for further processing or for use as a Diesel or other fuel oil, or it may be recycled through line 27 to the conversion system.

The gases from line 24 or liquefied gases from tower 23 are withdrawn through line 29 from its branches 29a or 29b, respectively, to low pressure gas storage tank 30. Gases or liquid from this tank and/or from some outside source 31 are passed by compressor or pump 32 to a pressure of about 100 to about 500 pounds per square inch, preferably about 300 to about 400 pounds per square inch, and introduced by line 33 into pressure purge chamber 34. This purge chamber is preferably heat-insulated and designed to withstand considerable pressures at fairly high temperatures, e. g. about 200 to 400° F. The composition of the gases in this chamber may vary throughout a considerable range but I prefer to employ gases containing considerable amounts of butane, propane, ethane with or without the corresponding olefins. A gas rich in butane is particularly suitable. A preferred operation involves removing a predominantly $C_3$—$C_4$ fraction as a liquid from fractionator 23 or other source 31 and charging it as a liquid by pump 32 into drum 34 where it is vaporized and maintained under pressure.

When the activity of the catalyst in chamber A has decreased to the point where revivification is necessary or desirable the valves are closed in lines 15a and 17a and the corresponding valves in lines 15b and 17b are opened so that chamber B is placed on-stream. Prior to regenerating the catalyst in chamber A it is desirable to strip the catalyst material of all normally liquid hydrocarbons. I have found that as much as 3 to 5% or more liquid hydrocarbons (based on charge) may be retained by such catalyst material and unless such oil is recovered the economics of the process may be seriously impaired. The use of steam and inert gases such as flue gas or nitrogen has been proposed for such stripping or purging, but inordinately large amounts of such gases are required, it is difficult and expensive to recover the oil from such gases and particularly in the case of steam certain catalyst materials may be impaired by the use of such purge gases.

I have discovered that normally gaseous hydrocarbons such as butane are remarkably effective for purging catalyst, that much smaller amounts of such gases are required than of gases heretofore used, and that the oil may be easily and quantitatively separated therefrom.

The normally gaseous hydrocarbons from pressure purge chamber 34 are conducted by line 35, preferably through a coil 36 in furnace 13 (or through some other suitable heating means) to header 37 from which they are introduced by branch line 38a into catalyst chamber 16a. The purge gas is preferably heated to a temperature of about 800 to about 900° F. so that the temperature of the catalyst chamber remains substantially constant during the purging step.

When the valve on line 38a is opened there is an immediate surge of hot butane, propane, etc. through the catalyst chamber so that the sweeping action of the gases supplements and augments the tendency of such vapors to absorb and vaporize hydrocarbons which are occluded in the catalyst material. A considerable pressure drop occurs through the chamber, the vapors leaving through line 39a preferably being at a pressure not higher than 100 pounds per square inch and preferably about 50 pounds per square inch or lower.

Purge gases and vapors, together with the oil removed from the catalyst material are passed to purge products surge chamber 40, thence to coils 41 in chamber 34 in order to utilize their contained heat for preheating further amounts of purge gases. It should be understood, of course, that any other suitable arrangement for cooling and/or recovering the heat content of the purge gas may be employed.

From coil 41 the gases and vapors pass through cooler 42 wherein their temperature is reduced to about 140 to 200° F. at which temperature the normally liquid hydrocarbons are condensed so that they may be separated from gases and vapors in separator 43. Gases and vapors from this separator are introduced by line 44 and cooler 44a into low pressure storage tank 30 and recovered liquids are removed from the system or are returned by line 49 to line 10, a liquid level control valve insuring against passage of vapors through this line. If purge gases high in propane or butane content are used the pressure in storage chamber 30 and the system preceding may be maintained sufficiently high so that the gases will liquefy on passing through cooler 44a.

Alternatively and preferably the gases from coil 41 may be passed through cooler 42, separator 43, lines 45 and 46 to stabilizer 23 from which lean purge gases are obtained as a liquid via line 29b. Another alternative which involves less equipment is to pass rich purge gases from coil 41 though lines 45 and 47 to fractionator 19. The liquids from separator 43 may be removed from the system instead of recycling.

Instead of passing the rich purge gases through heat exchanger 42 they may be introduced directly from surge chamber 40 by compressor 50 into pressure chamber 34. If this expedient is employed the heavy oils may be separated out in this chamber by a proper control of the pressure conditions therein, the optimum conditions corresponding to approximately the critical temperature and pressure of the purge gas employed. For instance, if propane is employed as a purge gas this chamber may be maintained at a temperature of about 200° F. and a pressure of about 400 to about 600 pounds per square inch, under which conditions substantially all of the normally liquid hydrocarbons separate out as a separate phase for withdrawal through line 51 and liquid level control valve 52. This method of operation effects economies in compression and heat utilization and is particularly advantageous when the composition of the purge gases is such that a relatively sharp separation of liquids from gases can be thus obtained.

In a very few minutes the catalyst material in chamber A is completely purged of normally liquid hydrocarbons so that the valve in line 38a may be closed. As soon as the pressure in chamber A is sufficiently low to insure the removal of most of the purging gases the valve in line 39a is closed. If pressures above atmospheric are used on low pressure side (storage 30) it will be desirable to further release purge gases to a low pressure refinery fuel gas system through line 53a after closing. Hot flue gas is introduced from insulated pressure storage tank 54, line 55, heater 56, manifold 57 and branch line 58a. The gases from chamber A may be withdrawn either before or after combustion to line 59a and manifold 60, and they may be returned by line 61 and compressor 62 to hot flue gas pressure tank 54, or they may be withdrawn from the system to line 63. Air for regeneration is then introduced through line 64 by compressor 65 which preferably discharges into a surge tank 66, the air being withdrawn therefrom in regulated amounts through line 67 to line 55, heater 56, manifold 57 and branch line 58a to catalyst chamber 16a.

Since practically all of the liquid hydrocarbons have been removed from the catalyst the heat liberated by regeneration is materially reduced and the problem of temperature control is greatly simplified. The amount of air introduced is so limited that in the initial stages of combustion the temperature will not rise materially above safe limits which in most cases is about 1050 to 1150° F. Later a considerable excess of air or oxygen is employed to insure substantially complete combustion of any carbonaceous material remaining on the catalyst.

During the final stages of regeneration when the oxygen-content of the flue gas is relatively high the exit gas is preferably vented through line 63. After combustion is complete hot flue gas is once more passed through the chamber in the absence of oxygen to purge the catalyst chamber of oxygen containing gas prior to its once more going on-stream.

It will be noted that in the case of the flue gas purging, as well as butane purging, that the use of pressure tank 54 effects considerable reduction in the required purging time. By maintaining flue gas storage tank 54 at a pressure of 200 to 400 pounds I can, by simply opening certain valves effect an immediate surge of this flue gas which sweeps out regeneration gases almost instantaneously. The use of pressure purging and high pressure drops through the catalyst chamber during the purging step greatly shortens the cycle times and thus increases the overall efficiency of the conversion process.

While I have described in detail a preferred embodiment of the invention it should be understood that the invention is equally applicable to other conversion processes and that innumerable alterations and modifications of the specified arrangements and conditions may be made without departing from the invention.

I claim:

1. In a hydrocarbon conversion process employing a solid catalyst which periodically becomes coated with carbonaceous materials, the method of recovering hydrocarbon oils from said coated catalyst materials prior to regeneration which comprises contacting said catalyst material with a normally gaseous hydrocarbon mixture rich in $C_3$ and $C_4$ hydrocarbons at a temperature of about 750 to about 950° F. and from a source at an initial pressure of about 50 to about 400 pounds per square inch.

2. The process of claim 1 which includes the step of introducing the hot normally gaseous hydrocarbon at relatively high pressure and withdrawing said hydrocarbon from the catalyst at relatively low pressure.

3. The method of claim 1 which includes the further step of cooling the normally gaseous hydrocarbon subsequent to its contact with the catalyst material for effecting the separation of a liquid phase therefrom, removing the liquid phase so separated and returning the gases for reuse.

4. The method of decreasing the cycle time in a hydrocarbon conversion process which requires periodic regeneration of a catalyst material in a catalyst chamber, which method comprises maintaining a large volume of purge gas under a pressure of about 200 to 400 pounds per square inch, disconnecting the catalyst chamber from the conversion system when purging is required, then passing the purge gas from said large volume thereof to said catalyst chamber without materially decreasing the temperature in said chamber and immediately withdrawing gases therefrom at a pressure below 50 pounds per square inch whereby there is an instantaneous surge of purge gases through said chamber for effectively cleaning out said chamber prior to regeneration of said catalyst.

5. The method of recovering oil from a spent catalyst prior to regeneration which comprises heating a normally gaseous hydrocarbon mixture rich in $C_3$ and $C_4$ hydrocarbons at a pressure of at least about 50 pounds per square inch, contacting spent catalyst with said heated hydrocarbon to effect rapid removal of oils from carbonaceous material by means of said hot normally gaseous hydrocarbon, subjecting the normally gaseous hydrocarbon together with the oil which it has removed from the catalyst to conditions of temperature and pressure for effecting the separation of said oil from said normally gaseous hydrocarbon, removing the separated oil from the normally gaseous hydrocarbon and returning at least a part of the normally gaseous hydrocarbon for reuse.

6. The method of claim 5 wherein the separation is effected at approximately the critical temperature of the normally gaseous hydrocarbon and under a pressure sufficient to maintain the oil in liquid phase at said temperature.

7. The method of claim 5 which includes the steps of cooling the normally gaseous hydrocarbon together with oil which has been recovered by it from spent catalyst material and condensing said oil from said cooled hydrocarbon prior to returning hydrocarbon for reuse.

WILLIAM B. PLUMMER.

CERTIFICATE OF CORRECTION.

Patent No. 2,259,485.  October 21, 1941.

WILLIAM B. PLUMMER.

It is hereby certified that error appears in the printed specification of the above numbered patent requiring correction as follows: Page 1, second column, line 29, for the word "dehydration" read --dehydrogenation--; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.